(12) United States Patent
Breed et al.

(10) Patent No.: US 10,465,053 B2
(45) Date of Patent: Nov. 5, 2019

(54) BARRIER FILM, METHODS OF MANUFACTURE THEREOF AND ARTICLES COMPRISING THE SAME

(71) Applicants: DOW GLOBAL TECHNOLOGIES LLC, Midland, MI (US); ROHM AND HAAS ELECTRONIC MATERIALS LLC, Marlborough, MA (US)

(72) Inventors: Dana Breed, Lake Jackson, TX (US); John W. Garnett, IV, Omaha, NE (US); Mark Heard, Lake Jackson, TX (US); Scott J. Collick, Lake Jackson, TX (US); Gregory M. Bunker, Midland, MI (US); Mark A. Kersten, Bull Valley, IL (US)

(73) Assignees: DOW GLOBAL TECHNOLOGIES LLC, Midland, MI (US); ROHM AND HAAS COMPANY, Philadelphia, PA (US)

( * ) Notice: Subject to any disclaimer, the term of this patent is extended or adjusted under 35 U.S.C. 154(b) by 453 days.

(21) Appl. No.: 14/278,543

(22) Filed: May 15, 2014

(65) Prior Publication Data

US 2015/0329734 A1 Nov. 19, 2015

(51) Int. Cl.
*C09D 127/08* (2006.01)
*C08J 7/04* (2006.01)
(Continued)

(52) U.S. Cl.
CPC .............. *C08J 7/042* (2013.01); *B32B 27/32* (2013.01); *C09D 123/06* (2013.01);
(Continued)

(58) Field of Classification Search
CPC .......... C08L 2205/02; C08L 23/10; C08J 5/18; Y10T 428/31913; Y10T 428/31917; Y10T 442/169; B32B 27/32; B32B 27/08
(Continued)

(56) References Cited

U.S. PATENT DOCUMENTS

| 3,645,992 A | 2/1972 | Trevor |
| 3,914,342 A | 10/1975 | Mitchell |

(Continued)

FOREIGN PATENT DOCUMENTS

| JP | H07251490 A | 10/1995 |
| JP | 2004216362 A | 8/2004 |

(Continued)

OTHER PUBLICATIONS

International Search Report for International Application No. PCT/US2015/030957; International Filing Date May 15, 2015; Report dated Jul. 30, 2015 (5 pages).

(Continued)

*Primary Examiner* — Samir Shah
(74) *Attorney, Agent, or Firm* — Cantor Colburn LLP

(57) ABSTRACT

Disclosed herein is a recyclable barrier film comprising a first layer comprising high density polyethylene; and a barrier layer comprising a polymer other than polyethylene; where the polymer is operative to reduce the oxygen transmission rate through the barrier film relative to the oxygen transmission rate through the first layer; where the barrier layer is present in the barrier film in an amount of less than 5 weight percent, based on the total weight of the barrier film. Disclosed herein too is a method of manufacturing the disclosed barrier film.

14 Claims, 2 Drawing Sheets

(51) Int. Cl.
*C09D 123/06* (2006.01)
*B32B 27/32* (2006.01)

(52) U.S. Cl.
CPC ......... *C09D 127/08* (2013.01); *C08J 2300/30* (2013.01); *C08J 2323/06* (2013.01); *C08J 2427/08* (2013.01); *Y10T 428/31913* (2015.04); *Y10T 428/31928* (2015.04); *Y10T 428/31938* (2015.04)

(58) Field of Classification Search
USPC .......................................................... 428/515
See application file for complete search history.

(56) References Cited

U.S. PATENT DOCUMENTS

| | | | |
|---|---|---|---|
| 4,076,698 | A | 2/1978 | Anderson et al. |
| 5,085,034 | A | 2/1992 | Haas |
| 5,272,236 | A | 12/1993 | Lai et al. |
| 5,278,272 | A | 1/1994 | Lai et al. |
| 5,491,011 | A | 2/1996 | Pezzoli et al. |
| 5,500,283 | A | 3/1996 | Kirk |
| 5,582,923 | A | 12/1996 | Kale et al. |
| 5,733,155 | A | 3/1998 | Sagawa |
| 5,783,638 | A | 7/1998 | Lai et al. |
| 5,854,045 | A | 12/1998 | Fang et al. |
| 6,403,231 | B1 | 6/2002 | Mueller |
| 6,764,751 | B2 | 7/2004 | Poirier |
| 2003/0148110 | A1 | 8/2003 | Holbert et al. |
| 2005/0255268 | A1 | 11/2005 | Burki et al. |
| 2006/0246242 | A1* | 11/2006 | Siegel et al. ................. 428/34.1 |
| 2007/0090172 | A1 | 4/2007 | Lyon et al. |
| 2007/0100076 | A1 | 5/2007 | Hayes et al. |
| 2009/0104468 | A1 | 4/2009 | Frisk |
| 2009/0202806 | A1 | 8/2009 | Ebina et al. |
| 2010/0189944 | A1* | 7/2010 | Illsley et al. ................. 428/36.7 |
| 2012/0196141 | A1† | 8/2012 | Pocius |
| 2013/0310782 | A1* | 11/2013 | Chang et al. ................. 604/333 |

FOREIGN PATENT DOCUMENTS

| | | |
|---|---|---|
| JP | 2005206976 A | 8/2005 |
| JP | 3916705 B2 | 5/2007 |
| JP | 3141708 | 5/2008 |
| JP | 2012071491 A | 4/2012 |
| WO | WO9414889 A1 | 7/1994 |
| WO | WO2005108065 A1 | 11/2005 |

OTHER PUBLICATIONS

Written Opinion for International Application No. PCT/US2015/030957; International Filing Date May 15, 2015; Report dated Jul. 30, 2015 (6 pages).

Shun Mitsui, "Food Packaging Material with Oxygen Barrier Properties", AITEC Food Research Center News, AITEC (Aichi Industrial Technology Institute) Food Research Center, Mar. 24, 2009, pp. 1-3, URL: http://www.aichi-inst.jp/shokuhin/other/shokuhin_news/s_no41_02.pdf.

Brody et al., "Innovative Food Packaging Solutions", Journal of Food Science, vol. 73, (2008), pp. R107-R116.†

Kissin, "Polyethylene, High Density", Kirk-Othmer Encyclopedia of Chemical Technology, John Wiley & Sons, Ltd., (2000), pp. 1 and 17.†

Delassus, "Barrier Polymers", Kirk-Othmer Encyclopedia of Chemical Technology, John Wiley & Sons, Ltd., (2000), pp. 375, 383-387, 394-396.†

Butler and Morris, "PE based multilayer film structures", Multilayer Flexible Packaging, Elsevier Inc., (2009), pp. 205-230.†

Armstrong, "New EVAL® EVOH Resins for Flexible Packaging", TAPPI, vol. 2, (2004), pp. 482-493.†

\* cited by examiner
† cited by third party

BARRIER FILM, METHODS OF MANUFACTURE THEREOF AND ARTICLES COMPRISING THE SAME

BACKGROUND

This disclosure relates to a barrier film, methods of manufacture thereof and to articles comprising the same.

Barrier films are useful for minimizing the transmission of oxygen and water vapor through the film to products that are contained in packaging made from the barrier film. Fruit and produce containers are often filled for transport and later stacked on site for display and/or storage purposes. As such, there are a variety of container configurations which facilitate the ability to stack multiple containers. Corrugated paperboard has been used for many years as a starting material to produce containers. Containers of corrugated paperboard include a single piece tray design having a bottom wall, two side walls, and two end walls, each hinged to the bottom wall. A single piece of corrugated paperboard will be cut and scored to form a flat blank that will then be erected into a container.

However, corrugated containers are prone to damage which occurs during handling, stacking, or impact by equipment or other materials. Further, since many paperboard containers are shipped or stored under refrigerated conditions, ambient moisture absorbed by the container often weakens the container to the point that its utility is compromised.

In addition, retailers prefer to use the shipping container for direct display for consumer sales. Typical corrugated containers used for this purpose often have minimal aesthetic properties. Further, such containers tend to be rapidly soiled by the container's contents, which further reduce the appearance of the packaging and retail display.

There remains a need to provide a container for transporting produce that has increased durability, greater strength, is more economical to store and ship, and is readily recyclable in conventional re-pulping operations. Accordingly, there remains room for improvement and variation within the art.

SUMMARY

Disclosed herein is a recyclable barrier film comprising a first layer comprising high density polyethylene; and a barrier layer comprising a polymer other than polyethylene; where the polymer is operative to reduce the oxygen transmission rate through the barrier film relative to the oxygen transmission rate through the first layer; where the barrier layer is present in the barrier film in an amount of less than 5 weight percent, based on the total weight of the barrier film.

Disclosed herein too is a method of manufacturing a barrier film comprising extruding a first layer; where the first layer comprises high density polyethylene; and disposing on the first layer a barrier layer; where the barrier layer comprises a polymer other than polyethylene; where the polymer is operative to reduce the oxygen transmission rate through the barrier film relative to the oxygen transmission rate through the first layer; where the barrier layer is present in the barrier film in an amount of less than 5 weight percent, based on the total weight of the barrier film.

DETAILED DESCRIPTION

Figure 1:
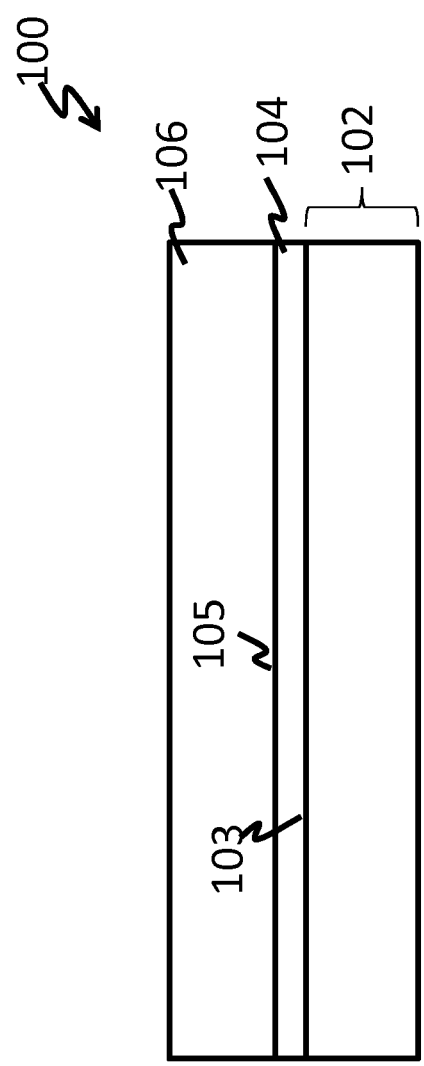
FIG. 1 is a schematic depiction of an exemplary barrier film that contains the optional second layer.

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer" and "propylene/α-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, etc. Thus, polyolefins include interpolymers such as ethylene-α-olefin copolymers, propylene-α-olefin copolymers, etc.

"Melting Point" as used here (also referred to a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

The term 'and/or" includes both "and" as well as "or". For example, the term A and/or B is construed to mean A, B or A and B.

Disclosed herein are recyclable barrier films that comprise a first layer (also termed the base layer) upon which is disposed a barrier layer. The barrier layer contacts the first layer along a first surface of the barrier layer. The barrier films reduce water vapor and oxygen transmissivity and thus can be used for packaging food stuffs and other commercial objects for extended periods of time without any degradation. In addition, the barrier film is optically transparent, which permits the film to be printed and also provides good visibility for objects contained in the packaging.

In an exemplary embodiment, the first layer comprises high density polyethylene, while the barrier layer comprises a polyvinylidene chloride. The high density polyethylene prevents water vapor transmission while the polyvinylidene chloride can be used to control or to minimize the oxygen transmission in addition to the water vapor transmission through the barrier film. The barrier layer is used in amounts small enough to permit recycling of the barrier film without any pretreatment of the barrier film to remove the barrier layer.

In an exemplary embodiment, the barrier film comprises an optional second layer (also termed a sealant layer) that is disposed on the barrier film and contacts the barrier film along a second surface that is oppositely disposed to the first surface. In another embodiment, the barrier film may comprise a plurality of barrier layers each barrier layer having a layer of polyethylene disposed on its opposing surfaces as detailed below.

The FIG. 1 is an exemplary depiction of the barrier film 100. The first layer 102 has disposed upon it the barrier layer 104. The barrier layer 104 contacts the first layer 102 along a first surface 103 and contacts an optional second layer 106 along a second surface 105. The barrier film 100 may comprises a plurality of barrier layers (not shown), with each layer having a polyethylene layer disposed on its opposing surfaces as shown in the FIG. 1.

In one embodiment, the first layer 102 comprises a polyethylene. The first layer 102 provides the dimensional stability for coating the barrier layer 104, during which water or solvent are driven off using heat. In one embodiment, the first layer comprises high density polyethylene (HDPE). In another embodiment, the first layer comprises high density polyethylene in an amount sufficient to maintain stability during various processing operations including coating the barrier layer and during the forming of different shapes for packaging. Other polyethylenes that can be blended with the HDPE to form the first layer 102 are ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), or combinations thereof.

High density polyethylene (HDPE) having densities greater than about 0.940 g/cm$^3$, which are generally prepared with Ziegler-Natta catalysts, chrome catalysts or even metallocene catalysts can be used in the first layer 102. The high density has a melt index of from 0.4 to 10 g/10 minutes when measured as per ASTM D 1238 at 2.16 kilograms and a temperature of 190σC.

In one embodiment, the first layer can comprise an extruded blend of high density polyethylene and low density polyethylene (LDPE). The low density polyethylene may have a density in the range of from 0.910 g/cm$^3$ to 0.940 g/cm$^3$; for example, from 0.915 g/cm$^3$ to 0.935 g/cm$^3$, and a melt index ($I_2$) in the range of from 0.1 to 5 g/10 minutes; for example, from 0.2 to 2 g/10 minutes, when measured as per ASTM D 1238 at 2.16 kilograms and a temperature of 190° C.

When a blend of high density polyethylene and other polyethylenes (i.e., LDPE, LLDPE, MDPE, or the like) is used in the first layer, it is desirable for the blend to maintain stability during various processing operations. The high density polyethylene is generally present in an amount of 50 to 99 weight percent (wt %), specifically 70 to 98 wt %, and more specifically 80 to 95 wt %, based on the total weight of the polyethylene blend.

Figure 2:
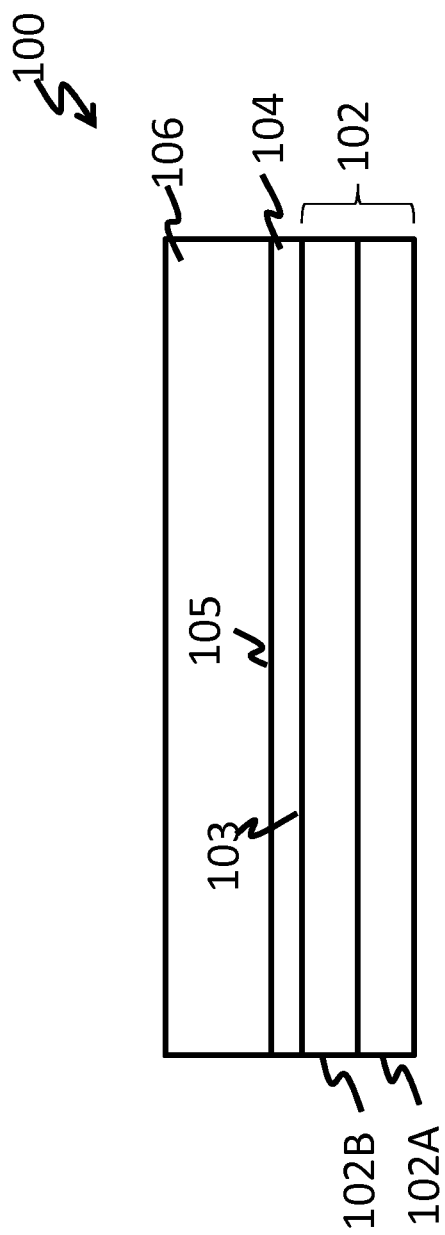
FIG. 2 is a schematic depiction of an exemplary barrier film that has a first layer that comprises a plurality of layers.

In one embodiment, the first layer 102 may comprise a plurality of layers one at least one of which comprises high density polyethylene. In other words, the first layer 102 can be a multilayered film comprising two or more layers. This is depicted in the FIG. 2, where the first layer comprises a first outer layer 102A and a second outer layer 102B. The first outer layer 102A comprises high density polyethylene, while the second outer layer 102B comprises either medium density polyethylene or low density polyethylene. The second outer layer 102B contacts the barrier layer.

The second outer layer 102B can be manufactured by coextrusion, lamination, or disposed from solution if desired and comprise some of the same polyethylenes listed above. Examples of commercially available polymers that may be used in the first layer 102, the first outer layer 102A and/or the second outer layer 102B are polyolefin plastomers (e.g., AFFINITY® and/or VERSIFY® commercially available from Dow Chemical Company and VISTAMAX® commercially available form Exxon) and olefin block copolymers (commercially available as INFUSE® from Dow Chemical Company).

When the first layer 102 comprises a plurality of layers, the various layers that constitute the first layer may be coextruded to form the first layer 102. It is to be noted that the first layer does not contain any reactive species that react with the food products that are carried in The first layer 102 has a thickness of 2 to 50 micrometers, specifically 3 to 45 micrometers, and more specifically 4 to 20 micrometers. In a preferred embodiment, the first layer 102 has a thickness of 10 to 60 percent of the total thickness of the barrier film 100.

The barrier layer can comprise any suitable polymer, such as, for example, polyamide, polyethylene vinyl acetate, hydrolyzed polyethylene vinyl acetate, polyvinylidene chloride, polyvinyl chloride, polyamide, polyester, polyalkylene carbonate, polyacrylonitrile, polyacrylate, polymethacrylate, or the like, or a combination comprising at least one of the foregoing polymers. Exemplary barrier layers comprise polyethylene vinyl acetate, hydrolyzed polyethylene vinyl acetate, polyvinylidene chloride, polyvinylidene chloride-polyvinyl chloride copolymer or polyvinylidene chloride-polymethylacrylate copolymer. In an exemplary embodiment, the barrier layer comprises polyvinylidene chloride.

The barrier layer may also provide desirable optical properties when stretch oriented, including transparency and low haze and a stretching behavior compatible with the layers disposed upon it. It is desirable that the thickness of the barrier layer be selected to provide the desired combination of the performance properties sought, e.g., with respect to oxygen permeability, shrinkage values especially at low temperatures, ease of orientation, delamination resistance, and optical properties. Suitable barrier layer thicknesses in barrier film is less than 15%, e.g., from 5 to 14% of the total film thickness and specifically less than about 10% of the total thickness of the barrier film. In an exemplary embodiment, the thickness of the barrier layer may advantageously be 1 to 15 micrometers, specifically 2 to 12 micrometers and more specifically 3 to 10 micrometers.

In an exemplary embodiment, the aforementioned polymers used in the barrier layer 104 may be applied as a coating to the first layer 102. The barrier layer can be in the form of a dispersion, an emulsion, a suspension or a latex prior to their being used as coatings on the first layer. In an exemplary embodiment, the barrier layer can be in the form of a latex. The latex may be applied in the form of a continuous coating or a discontinuous coating to the first layer 102. In one embodiment, a primer may be applied to the first layer 102 prior to the application of the latex, while in other embodiments, no primer is used prior to the application of the latex.

In one embodiment, the latex may contain clay. The presence of the clay is optional. The clay particles are exfoliated and intercalated by the polymer. Examples of suitable clays are anionic platelet materials such as laponite, montmorillonite, saponite, beidellite, vermiculite, nontronite, hectorite, fluorohectorite, or the like, or a combination comprising at least one of the foregoing clays. The clay is present in the latex in an amount of 5 to 30 wt %, specifically 7 to 28 wt %, and more specifically 10 to 25 wt %, based on the total weight of the latex.

The latex (with or without the clay) is used in the barrier film 100 in an amount of less than 5 wt %, specifically less than 4 wt % and more specifically less than 3 wt %, based on the total weight of the barrier film. In one embodiment, the latex is present in an amount of less than 5 wt %, specifically less than 4 wt % and more specifically less than 3 wt %, based on the total weight of the first layer 102. As noted above, it is preferable for the first layer 102 to comprise high density polyethylene.

The use of such a low amount of latex in the barrier film 100 permits recycling of the barrier film 100. In addition, the use of a low amount of latex permits the retention of dimensional stability in the barrier film 100 while at the same time reducing the oxygen transmissivity through the barrier film 100.

The use of the barrier layer 104 in the barrier film 100 reduces the oxygen transmission by up to 75 percent, specifically by 5 to 60 percent, and more specifically by 15 to 50 percent when compared with other comparative films that have the same composition with a different latex and/or that does not contain clay. An exemplary barrier layer comprises polyvinylidene chloride sold as Serfene® 411 commercially available from the Owensboro Specialty Polymers, Inc. Serfene® 2026 or Serfene® 2022 commercially available from the Owensboro Specialty Polymers, Inc., may be used as primers.

As noted above (with reference to the FIG. 1), a second layer 106 is disposed on the barrier layer 104. The second layer 106 is also called the sealant layer. In an exemplary embodiment, the second layer 106 comprises linear low density polyethylene (LLDPE). LLDPE is a copolymer (also referred to as an interpolymer) of ethylene and an α-olefin having 3 to 12 carbon atoms, specifically 4 to 8 carbon atoms (e.g., propene, 1 butene, 4-methyl-1-pentene, 1-hexene, 1 octene, 1-decene, and the like), that has sufficient α-olefin content to reduce the density of the copolymer to that of LDPE. The term "LLDPE", includes both—resin manufactured using the traditional Ziegler-Natta catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the processes disclosed in U.S. Pat. No. 4,076,698; and/or blends thereof (such as those disclosed in U.S. Pat. No. 3,914,342 or 5,854,045). The LLDPE can be made by any process such as gas phase polymerization, solution phase polymerization, slurry polymerization or combinations thereof.

In one embodiment, the LLDPE used in the second layer 106 comprises the linear low density polyethylene having a melt index $I_2$ of 0.25 to 20 g/10 minutes when measured as per ASTM D 1238 at 190° C. and 2.16 kg, and a density of less than 0.930 grams per square centimeter (measured as per ASTM D 792). An exemplary LLDPE for use in the second layer 106 is ELITE™ AT 6111, which is an ethylene-octene copolymer with melt index of 3.7 g/10 min (measured as per ASTM D1238 at 190° C. and 2.16 kg), density 0.912 g/cc (measured as per ASTM D 792), and commercially available from The Dow Chemical Company. Other exemplary LLDPE's that can be used in the outer layers 102 and 110 are linear ethylene-based polymers such as DOWLEX™ Polyethylene Resins, ELITE™ and ELITE™ AT brand enhanced polyethylene resin, all available from The Dow Chemical Company, and Exceed™ metallocene polyethylenes, available from ExxonMobil Chemical Company.

Another exemplary polyethylene for use in the second layer 106 is homogeneously branched ethylene-α-olefin copolymers. These copolymers can be made with a single-site catalyst such as a metallocene catalyst or constrained geometry catalyst, and typically have a melting point of less than 105, specifically less than 90, more specifically less than 85, even more specifically less than 80 and still more specifically less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane.

Other elastomers may also be used in the second layer 106. The polyolefin elastomers may also comprise random or block propylene polymers (i.e., polypropylenes). The random polypropylene elastomer typically comprises 90 or more mole percent units derived from propylene. The remainder of the units in the propylene copolymer is derived from units of at least one α-olefin.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, and the like) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, or a combination thereof.

It is to be noted that neither the first layer 102 nor the second layer 106 contains any reactive species that can react with meat or with any enclosed products that are contained in the packaging. In other words, the surfaces of the first layer 102 and the second layer 106 are free of reactive species that contain nitrogen.

In one embodiment, in one method of manufacturing the barrier film 100, the first layer 102 may be extruded from high density polyethylene. If the first layer 102 comprises a plurality of layers (as depicted in the FIG. 2), then the various layers may be coextruded to produce the first layer 102. The barrier layer 104 may then be disposed on the first layer 102 in the form of a coating. Upon applying the coating, the barrier film 100 may be subjected to heating to evaporate any solvent or fluid that is used in the latex. The barrier film 100 thus formed may then optionally be laminated with the second layer 106 (the sealant layer) in a roll mill.

In another embodiment, in another method of manufacturing the barrier film 100, the first layer 102, the barrier layer 104 and optionally the second layer 106 may all be coextruded to form the barrier film 100. The barrier film 100 thus formed may optionally be subjected to lamination in a roll mill.

As detailed above, the barrier film thus formed may be subjected to recycling. The use of a barrier layer that is less than 5 wt % of the total weight of the barrier film permits the direct recycling of the film after usage without any pretreatment. The used barrier film may be directly extruded in a polyethylene based stream and used for other purposes or may be used to form the first layer of another barrier film.

The barrier film 100 is advantageous in that it can be fully recycled in a polyethylene-based stream. The barrier film 100 has high clarity and gloss. The barrier film 100 also has enhanced transparency over a standard high density polyethylene. The high density polyethylene has unique moisture barrier and the polyvinylidene chloride coating provides oxygen barrier and additional moisture barrier. The polyvinylidene chloride is sufficiently durable to be unprotected (not laminated) in a film. The film should be directly printable. Normally, polyethylene is not coated directly due to dimensional stability in the coating ovens, but at low weight percent polyvinylidene chloride coating and with a carefully chosen sealant, this obstacle can be overcome.

The barrier film and the method of manufacturing the barrier film is demonstrated in the following non-limiting examples.

EXAMPLES

This example was conducted to demonstrate the barrier properties of the barrier film that contained a first layer of high density polyethylene and a barrier layer of polyvinylidene chloride. The experiment consisted of applying (a) a prime coat of either Serfene 2026-45 or Serfene 2022; and (b) a topcoat of Serfene 411, to a developmental high moisture barrier HDPE. These were applied in a two deck setup on the Egan pilot coater at 100 feet per minute (fpm), with the primer applied at deck 1 using a 165 quad cylinder and dried at 165° F., and the topcoat using a 110 trihelical cylinder and dried with two zones of 170° F. and 180° F., respectively. The relatively slow run speed was chosen to ensure adequate drying at these temperatures. The Serfenes were all run with a conventional doctor blade, neat, except for one experiment in which a Serfene 2022 prime coat was diluted from 50% to 40% nonvolatile content. There were two variations of HDPE used, labeled #1 and #4. The initial surface tension of variation #1 was measured as 33 mN/m (dyn/cm). Both #1 and #4 were corona treated inline.

The results are shown in the Table 1 and Table 2 below. Table 1 shows the oxygen transmission results, while Table 2 shows the adhesion results.

TABLE 1

| Coating | Coat Weight (lbs./ream) | Film #1 OTR* (cc/100 in$^2$/ 24 hr; 23° C., 0% RH) | Film #4 OTR* (cc/100 in$^2$/ 24 hr; 23° C., 0% RH) |
| --- | --- | --- | --- |
| Serfene 2022/411 | 2.0 + 2.4 = 4.4 | 0.33 | 0.32 |
| Serfene 2026-45/411 | 1.7 + 2.4 = 4.1 | 0.31 | 0.38 |
| Serfene 2022 @ 40% NV/411 | 1.0 + 2.4 = 3.4 | 0.35 | not tested |
| Uncoated film | — | 62 | 62.5 |

*OTR = oxygen transmission rate;

TABLE 2

| Coating | Film #1 Crosshatch Adhesion | Film #4 Crosshatch Adhesion |
| --- | --- | --- |
| Serfene 2022/411 | both 2022 and 411 lifted | neither 2022 nor 411 lifted |
| Serfene 2026-45/411 | neither 2022 nor 411 lifted | some loss of adhesion to HDPE |
| Serfene 2022 @ 40% NV/411 | some loss of adhesion to HDPE | some loss of adhesion to HDPE |

Both coating decks performed well and the coatings appeared to dry well. The clarity was as expected for an HDPE, though there was some unevenness in appearance due to a combination of variations in drive speed, an uneven impression roll and unevenness in the films themselves. In general, Serfene 2022 when used as a primer showed more clarity than S 2026-45.

Coat weights on the primers could be varied between one and two pounds per ream (ppr), depending on dilution. The topcoat coat weight was fixed at 2.4 ppr. For both the primer and topcoat, the coat weights obtained were the lowest possible for this combination of cylinder and line speed, without further dilution. Oxygen barrier was very consistent across both primers and across both films. It was also surprisingly consistent even in the dilution experiment, reducing the coat weight by 20%. There appeared to be no compromise to oxygen barrier in any of the samples, despite the lower than recommended standard of "two coats of three ppr", judging by the numerically very high oxygen barrier of the bare films. Crosshatched tape adhesion appears to be dependent on the film, with film #4 yielding better results. However, in neither case could the adhesion be considered superior.

What is claimed is:
1. A recyclable barrier film comprising:
   a first layer comprising high density polyethylene,
   a barrier layer comprising a polymer other than polyethylene; where the polymer is operative to reduce the oxygen transmission rate through the barrier film relative to the oxygen transmission rate through the first layer; where the barrier layer is present in the barrier film in an amount of less than 5 weight percent, based on the total weight of the barrier film; and a sealant layer that contacts the barrier layer;
where the first layer and the sealant layer do not contain any reactive species that react with a food product; and
where the first layer and the sealant layer are opposing outer layers of the recyclable barrier film.

2. The recyclable barrier film of claim 1, where the barrier layer comprises a polyamide, a polyethylene vinyl acetate, a hydrolyzed polyethylene vinyl acetate, a polyvinylidene chloride, a polyvinylidene chloride-polyvinyl chloride copolymer, a polyvinylidene chloride-polymethylacrylate copolymer a polyester, a polyalkylene carbonate, a polyacrylonitrile, a polyacrylate, a polymethacrylate, or a combination thereof.

3. The recyclable barrier film of claim 1, where the barrier layer comprises polyvinylidene chloride.

4. The recyclable barrier film of claim 1, where the barrier layer further comprises intercalated clay.

5. The recyclable barrier film of claim 1, where the sealant layer comprises linear low density polyethylene.

6. The recyclable barrier film of claim 1, where the sealant layer comprises a polyolefin elastomer.

7. The recyclable barrier film of claim 1, where the first layer comprises a plurality of layers; where at least one layer of the plurality of layers comprises high density polyethylene.

8. An article comprising the recyclable barrier film of claim 1.

9. A recyclable barrier film comprising:
a first layer comprising high density polyethylene,
a barrier layer comprising a polymer other than polyethylene; where the polymer is operative to reduce the oxygen transmission rate through the barrier film relative to the oxygen transmission rate through the first layer; where the barrier layer is present in the barrier film in an amount of less than 5 weight percent, based on the total weight of the barrier film; and
a second layer that contacts the barrier layer; where the second layer contacts the barrier layer at a surface that is opposed to a surface that contacts the first layer; where the first layer and the second layer are free of reactive species that contain nitrogen.

10. The recyclable barrier film of claim 9, where the barrier layer comprises a polyamide, a polyethylene vinyl acetate, a hydrolyzed polyethylene vinyl acetate, a polyvinylidene chloride, a polyvinylidene chloride-polyvinyl chloride copolymer, a polyvinylidene chloride-polymethylacrylate copolymer a polyester, a polyalkylene carbonate, a polyacrylonitrile, a polyacrylate, a polymethacrylate, or a combination thereof.

11. The recyclable barrier film of claim 9, where the barrier layer comprises polyvinylidene chloride.

12. The recyclable barrier film of claim 9, where the barrier layer further comprises intercalated clay.

13. The recyclable barrier film of claim 9, where the second layer comprises linear low density polyethylene.

14. The recyclable barrier film of claim 9, where the second layer comprises a polyolefin elastomer.

* * * * *